(12) United States Patent
Meyer et al.

(10) Patent No.: US 9,695,904 B2
(45) Date of Patent: Jul. 4, 2017

(54) CENTRIFUGAL PENDULUM DEVICE, AND DRIVE TRAIN OF A MOTOR VEHICLE

(71) Applicant: AUDI AG, Ingolstadt (DE)

(72) Inventors: Herbert Meyer, Regensburg (DE); Sebastian Schulze, Lenting (DE)

(73) Assignee: AUDI AG, Ingolstadt (DE)

( * ) Notice: Subject to any disclaimer, the term of this patent is extended or adjusted under 35 U.S.C. 154(b) by 145 days.

(21) Appl. No.: 14/654,282

(22) PCT Filed: Dec. 9, 2013

(86) PCT No.: PCT/EP2013/003718
§ 371 (c)(1),
(2) Date: Jun. 19, 2015

(87) PCT Pub. No.: WO2014/095000
PCT Pub. Date: Jun. 26, 2014

(65) Prior Publication Data
US 2016/0195158 A1    Jul. 7, 2016

(30) Foreign Application Priority Data

Dec. 22, 2012    (DE) .................. 10 2012 025 327

(51) Int. Cl.
*F16F 15/14*    (2006.01)
(52) U.S. Cl.
CPC .................................. *F16F 15/145* (2013.01)
(58) Field of Classification Search
CPC ............... F16F 15/1414; F16F 15/1421; F16F 15/1442; F16F 15/145; Y10T 74/2121; Y10T 74/2128; B60K 6/105
See application file for complete search history.

(56) References Cited

U.S. PATENT DOCUMENTS

| 6,109,134 A | 8/2000 | Sudau |
| 6,280,330 B1 | 8/2001 | Eckel |
| 8,424,659 B2 * | 4/2013 | Otanez ................ F16F 15/1421 188/378 |
| 8,597,129 B2 | 12/2013 | Meyer et al. |
| 2011/0180358 A1 | 7/2011 | Otanez |

(Continued)

FOREIGN PATENT DOCUMENTS

| CN | 101086290 | 12/2007 |
| CN | 102439329 | 5/2012 |

(Continued)

OTHER PUBLICATIONS

International Search Report issued by the European Patent Office in International Application PCT/EP2013/003718.

(Continued)

*Primary Examiner* — Adam D Rogers
(74) *Attorney, Agent, or Firm* — Henry M. Feiereisen LLC

(57) ABSTRACT

A centrifugal pendulum device includes a pendulum mass carrier, which is rotatable about a rotation axis, and at least one pendulum mass, which is supported on the pendulum mass carrier for movement along a track between end stops which are spaced from one another in circumferential direction in relation to the rotation axis. A spring device urges the pendulum mass in one of the end stops, when the rotation speed of the pendulum mass carrier drops below a limit rotation speed.

17 Claims, 2 Drawing Sheets

(56) References Cited

U.S. PATENT DOCUMENTS

| | | | |
|---|---|---|---|
| 2012/0055281 A1* | 3/2012 | Huegel | F16F 15/145 |
| | | | 74/574.2 |
| 2013/0045809 A1 | 2/2013 | Meyer et al. | |
| 2013/0233125 A1 | 9/2013 | Jung | |
| 2016/0169358 A1* | 6/2016 | Kawahara | F16F 15/1421 |
| | | | 192/3.28 |
| 2016/0245365 A1* | 8/2016 | Movlazada | F16F 15/145 |
| 2016/0333961 A1* | 11/2016 | Dinger | F16F 15/145 |

FOREIGN PATENT DOCUMENTS

| | | | | |
|---|---|---|---|---|
| DE | 19734322 | | 2/1999 | |
| DE | 198 31 158 | | 1/2000 | |
| DE | 19914871 | | 10/2000 | |
| DE | 10 2010 049 553 | | 5/2011 | |
| DE | 102011012606 | | 9/2011 | |
| DE | 10 2011 100 895 | | 12/2011 | |
| DE | 10 2012 214 214 | | 3/2013 | |
| DE | WO 2014005907 A1 * | | 1/2014 | ............ F16F 15/145 |
| DE | 102014213681 A1 * | | 2/2015 | ............ F16F 15/145 |
| DE | WO 2015161847 A1 * | | 10/2015 | ............ F16F 15/145 |
| DE | 102014221692 A1 * | | 4/2016 | ............ F16F 15/145 |
| EP | 0 803 659 | | 12/2001 | |
| FR | WO 2015140456 A1 * | | 9/2015 | ............ F16F 15/145 |

OTHER PUBLICATIONS

Chinese Search Report issued on Jan. 18, 2016 with respect to counterpart Chinese patent application 201380071048.5.
Translation of Chinese Search Report issued on Jan. 18, 2016 with respect to counterpart Chinese patent application 201380071048.5.

* cited by examiner

CENTRIFUGAL PENDULUM DEVICE, AND DRIVE TRAIN OF A MOTOR VEHICLE

CROSS-REFERENCES TO RELATED APPLICATIONS

This application is the U.S. National Stage of International Application No. PCT/EP2013/003718, filed Dec. 9, 2013, which designated the United States and has been published as International Publication No. WO 2014/095000 and which claims the priority of German Patent Application, Serial No. 10 2012 025 327.3, filed Dec. 22, 2012, pursuant to 35 U.S.C. 119(a)-(d).

BACKGROUND OF THE INVENTION

The invention relates to a centrifugal pendulum device having a pendulum mass carrier, which is rotatable about a rotation axis, and at least one pendulum mass, which is supported on the pendulum mass carrier for movement along a track between two end stops which are spaced from one another in circumferential direction in relation to the rotation axis. The invention further relates to a drive train of a motor vehicle.

Such a centrifugal pendulum device is used, for example, in the drive train of the motor vehicle in order to suppress, at least in part, preferably completely, torsional vibrations which are caused by a drive unit of the drive train, in particular an internal combustion engine. The centrifugal pendulum device thus serves as vibration damper. Unlike other vibration dampers, it can be tailored to a specific order over a wide rotation speed range. The basic principle is hereby the use of the centrifugal force, which acts in the presence of a certain rotation speed of the pendulum mass carrier about the rotation axis upon the pendulum mass, as restoring force upon the vibration mechanism, i.e., in particular on the pendulum mass. The centrifugal force causes, for example, a shift of the pendulum mass in relation to the pendulum mass carrier along the track or causes a force acting in circumferential direction. In this way the movement of the pendulum mass is influenced by a swing angle of the centrifugal pendulum device.

At low rotation speeds of the pendulum mass carrier, the stabilizing centrifugal force acting on the pendulum mass is so low that the pendulum mass is able to hit back and forth between the end stops. This usually generates undesirable noise. In addition, when accordingly arranging the centrifugal pendulum device, the pendulum mass is influenced by gravity. For example, this impact of gravity causes the pendulum mass to plunge from one of the end stops to the opposite one of the end stops upon each rotation of the pendulum mass carrier. As a result, noises caused by the thus encountered impact upon the end stop can have an annoying effect and therefore are invariably undesirable. To address this problem, centrifugal pendulum devices oftentimes have damping elements of elastic material, which are arranged on the end stops to cushion the impact of the pendulum mass.

SUMMARY OF THE INVENTION

It is therefore an object of the invention to provide a centrifugal pendulum device which further and more effectively reduces noise during operation of the centrifugal pendulum device, even at low speeds compared to known measures, for example, the aforementioned damping elements.

This is achieved in accordance with the invention by a centrifugal pendulum device including a pendulum mass carrier rotatable about a rotation axis, and at least one pendulum mass, which is supported on the pendulum mass carrier for movement along a track between end stops spaced from one another in circumferential direction in relation to the rotation axis, wherein a spring device is provided which is configured to urge the pendulum mass against one of the end stops, when the rotation speed of the pendulum mass carrier about the rotation axis drops below a limit rotation speed. The pendulum mass is thus prevented from moving, until the pendulum mass carrier has reached a rotation speed about the rotation axis, which is preferably sufficient to enable the centrifugal force to stabilize the pendulum mass. Such self-stabilization occurs when the rotation speed has reached or exceeded the limit rotation speed. The limit rotation speed is hereby selected in accordance with the configuration of the centrifugal pendulum device or the pendulum mass. In the presence of a rotation speed which is less than the limit rotation speed, the damping effect of the centrifugal pendulum device is normally not required. Thus, the fact that the movement of the pendulum mass along the track is blocked is not disadvantageous.

Urging the pendulum mass against one of the end stops ensures a reliable fixation of the pendulum mass that does not allow, not even by accident, a shift of the pendulum mass. The reason for this resides in the rigidity of the end stop, upon which the pendulum mass rests, so that no further shift in the direction of the end stop or beyond the end stop is permitted. At the same time, the spring device causes a spring force which urges the pendulum mass toward the end stop. The spring device is hereby preferably dimensioned to prohibit any shift of the pendulum mass away from the end stop. As an alternative or in addition, other measures can be provided to implement such a fixation in the end stop. Of course, the afore-described damping elements may be additionally provided in order to even further reduce noise formation of the centrifugal pendulum device during its operation.

Preferably, the spring device is configured to liberate the pendulum mass, in particular to fully release it, when the rotation speed of the pendulum mass carrier about the rotation axis has reached or exceeded the limit rotation speed. As a result, the pendulum mass is then no longer urged toward the end stop or against the end stop, so as to be able to subsequently move along the track. In the case of complete liberation, the spring device is no longer capable to influence the pendulum mass, when the limit rotation speed has been reached. The pendulum mass is therefore able to move absolutely uninhibitedly along the track. This has the advantage of a significant simplification of the design and adaptation of the pendulum mass because there is no need to take into account any effects by the spring element.

According to a refinement of the invention, the track is configured such that the pendulum mass assumes a first radial position with respect to the rotation axis, when resting against one of the end stops, and assumes a second, greater radial position, when distanced from the end stops. As already explained, the pendulum mass, so long as the spring device does not urge it against one of the end stops, can move along the track, which extends between the end stops, i.e. limited at each end by one of the end stops. The track is hereby configured in the afore-mentioned manner. The first radial position lies closer to the rotation axis of the pendulum mass carrier than the second radial position, which is thus greater or located further to the outside. When now moving along the track, the pendulum mass always assumes at a distance to the end stops the second radial position which is greater than the first radial position. The described second radial position is therefore not a constant value, but changes normally over the circumferential position of the pendulum mass with respect to the pendulum mass carrier.

According to an advantageous configuration of the invention, the spring device urges the pendulum mass in radial direction inwardly, especially into the first radial position, when the rotation speed drops below the limit rotation speed. The spring device thus causes in this case a spring force which is directed inwards in a radial direction. In combination with the afore-described configuration of the track, according to which the first radial position in the end stops is the smallest radial position along the track, a force is established upon the pendulum mass in the direction of one of the end stops. It is thus, of course, especially advantageous when the spring device, at respectively small rotation speed of the pendulum mass carrier, urges the pendulum mass into the first radial position, in which the pendulum mass automatically rests against one of the end stops. The track is hereby preferably configured with a steady course and with a sufficiently large incline so that the spring device automatically causes the shift of the pendulum mass in the direction of one of the end stops, when the spring force acts upon the pendulum mass.

According to a preferred configuration of the invention, the spring device has a spring element with a contact area, wherein the spring element is designed such that the contact area is urged toward a radial holding position, when the rotation speed drops below the limit rotation speed, so as to subject the pendulum mass to a spring force, which is directed toward the first radial position, and assumes a radial release position as a result of centrifugal force impact, when the rotation speed is greater than or equal to the limit rotation speed. The spring device includes at least the at least one spring element. The latter has the contact area, which can be brought into touching contact with a mating contact area of the pendulum mass through respective shift of the contact area for applying a force upon the pendulum mass. The spring element, in particular the spring constant thereof, is suited to the limit rotation speed. When the rotation speed of the pendulum mass carrier falls below this limit rotation speed, the contact area should assume the radial holding position or at least move towards this radial holding position. As soon as the contact area of the spring element comes into touching contact with the mating contact area of the pendulum mass, the pendulum mass is urged by the spring force of the spring element together with the contact area in direction of the first radial position. When the contact area is in the radial holding position, the pendulum mass has reached the first radial position and thus rests upon the end stop.

When, on the other hand, the pendulum mass carrier is at a rotation speed which is greater than or equal to the limit rotation speed, the spring element should then permit or cause a shift of the contact area, so that the contact area is arranged in the radial release position. The latter is preferably selected such that the contact area is prevented from a touching contact with the pendulum mass or the mating contact area thereof, regardless of the position of the pendulum mass or the pendulum mass carrier. Accordingly, the movement of the pendulum mass is no longer interfered by the spring device, when the contact area is arranged in the radial release position. This is of particular importance because any influence on the pendulum mass impedes its movement, which is highly dependent on friction. As a result of the afore-described design of the centrifugal pendulum device, the need, even if only temporary, of an arrangement of additional elements on the pendulum mass is eliminated, so that the pendulum mass can be shifted unimpededly at all times and a vibration absorption can thus be realized with high quality, when the pendulum mass carrier rotates at sufficiently high rotation speed.

According to a further configuration of the invention, the contact area has a locking element and the pendulum mass has at least one mating locking element, which interact with one another formfittingly in circumferential direction, when the contact area assumes the radial holding position for fixation of the pendulum mass in relation to the pendulum mass carrier. Both, the afore-described contact area and the mating contact area are initially typically designed only for imparting a force, directed toward the first radial position, upon the pendulum mass. There is no force transfer in circumferential direction with respect to the rotation axis of the pendulum mass carrier. Such a force is, however, realized by the provision of the locking element upon the contact area and the mating locking element upon the pendulum mass or the mating contact area.

For example, the locking element is configured in the form of a protrusion and the mating locking element in the form of a locking receptacle of a shape conforming to the locking protrusion. Provision is now made for a locking cooperation of the locking element with the mating locking element, at latest when the contact area reaches the radial holding position and the pendulum mass reaches the first radial position. For this purpose, both elements engage by a form fit. Thus, the locking element and the mating locking element are configured such that not only the spring force, pointing in the direction of the first radial position, is imposed upon the pendulum mass, but also the fixation of the pendulum mass is effected in the circumferential direction. This means that once the pendulum mass reaches the end stop, while the contact area is in the radial holding position, the pendulum mass is reliably held on or in the end stop.

Provision may hereby be made for the pendulum mass to have several mating locking elements, with each end stop being associated to one of these mating locking elements. This embodiment is particularly advantageous because it is ensured that the pendulum mass is reliably held in each end stop, without the need for the spring device to apply a spring force which is dimensioned large enough to compensate all the forces acting on the pendulum mass or to counteract them. Rather, it is sufficient when the spring device has urged the pendulum mass against one of the end stops so as to subsequently ensure the form-fitting holding the pendulum mass there. The locking element interacts hereby by form fit with the mating locking element associated to the respective end stop.

According to a refinement of the invention, provision is made for at least one embodiment that the locking element and the mating locking element are arranged such as to cooperate with one another in a formfitting manner to hold the pendulum mass, when the contact area is arranged in the radial holding position and the pendulum mass rests upon the end stop associated to the mating locking element. This is particularly advantageous when, as mentioned above, one of several mating locking elements is associated with each end stop.

According to a preferred embodiment of the invention, provision may further be made for the spring element to have a weight which causes the centrifugal force influence, with the contact area and/or the locking element being formed on the weight. The weight may be the spring element itself or an additional, i.e. separate, element to realize the weight. The latter is preferably made of different material than the spring element, but may also be made of the same material. The spring element and the weight complement one another such that the pendulum mass is liberated, especially fully released, when the rotation speed of the pendulum mass carrier reaches the limit rotation speed. Preferably, the contact area and/or the locking element are present on the weight. In particular, the weight can itself constitute the locking element, which has at least some areas which interact with the mating locking element in a respective arrangement, for example engage therein. For example, the weight can be configured in the form of a sphere, while the mating locking element is realized as hemispherical depression conformed to the dimensions of the sphere.

Finally, it can be provided that the spring element is supported on the pendulum mass carrier on both sides of the contact area, as viewed in circumferential direction, in particular rotatably supported. In this way, stability is particularly high and a uniform application of force upon the pendulum mass is also achieved. The support can be a rigid securement of the spring element on the pendulum mass carrier. As an alternative, a support is provided such that the spring element can be shifted, in particular rotated, at least to a limited extent with respect to the pendulum mass carrier, for example like a fixed bearing. In this way, sufficient clearance is provided in order to attain with the help of the spring element, both the fixation of the pendulum mass in the region of the end stops and the preferably full release of the pendulum mass.

The invention further relates to a drive train of a motor vehicle with a drive unit and at least one wheel that can be driven by the drive unit. A centrifugal pendulum device according to one or more of the preceding claims is hereby provided. Particularly preferred is a permanent operative connection of the centrifugal pendulum device to the wheel. The advantages of such a configuration have already been discussed. Both the drive train and the centrifugal pendulum device can be refined according to the foregoing descriptions, so that reference is made thereto.

In drive trains with known centrifugal pendulum devices, the latter is permanently operatively connected to the drive unit, for example an internal combustion engine or the like, and thus is located on the drive-unit-proximal side of a separating clutch or starting clutch. As a result, the aforementioned noise development is encountered merely during starting process and a stopping process of the drive unit, which normally are very short. The self-stabilization of the pendulum mass is thus reached quickly. For example, the limit rotation speed up to which noise occurs is 150 rpm.

However, when arranging the centrifugal pendulum device on the wheel-proximal side of the separating clutch or starting clutch, self-stabilization is attained only above a certain limit rotation speed of the motor vehicle. At slow travel of the motor vehicle, noise may thus develop over a long time period. This is also the case, when in addition to the drive unit a further drive unit is associated, which is permanently operatively connected to the wheel. In this case, for example, the drive unit and the further drive unit form a hybrid drive assembly of the motor vehicle. When the motor vehicle is now driven solely with the further drive unit, i.e. the separating clutch is disengaged from the drive unit, again the above-described noise may develop. The advantage of the afore-described centrifugal pendulum device resides in particular in that it can be freely arranged in the drive train, without regard to the encountered rotation speeds there because the fixation of the pendulum mass reduces or prevents noise formation below the limit rotation speed at all times and a reliable vibration damping is achieved as of the limit rotation speed.

BRIEF DESCRIPTION OF THE DRAWING

Exemplary embodiments of the invention will now be described in greater detail with reference to the drawing, without limiting the invention. It is shown in.

DETAILED DESCRIPTION OF PREFERRED EMBODIMENTS

Figure 1:
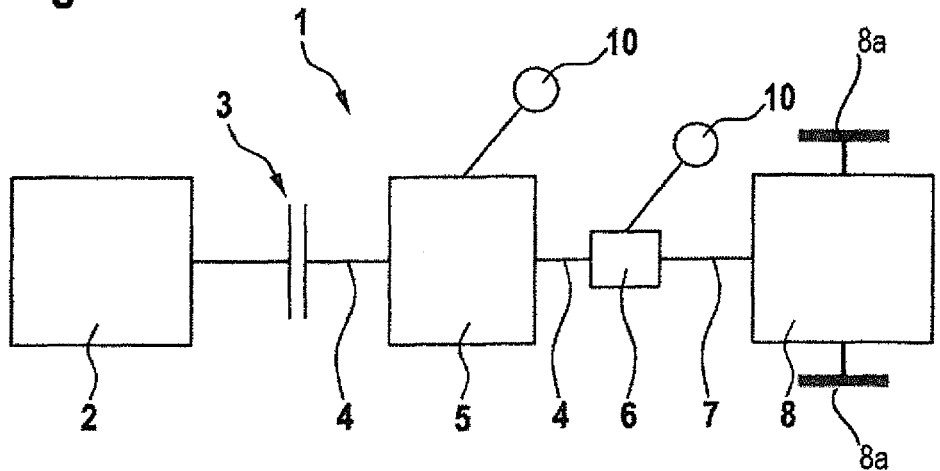
FIG. 1 a schematic illustration of a drive train of a motor vehicle with at least one centrifugal pendulum device, FIG. 2 a longitudinal section through a region of a drive unit of the drive train, to which the centrifugal pendulum device is associated, and FIG. 3 a cross section through a portion of the centrifugal pendulum device.

FIG. 1 shows a schematic illustration of a drive train 1 of a motor vehicle. The drive train has a drive unit 2, which is configured in the embodiment presented here as internal combustion engine. The drive unit 2 is operatively connected or operatively connectable via a separating clutch 3 with a shaft 4 of a further drive unit 5, which is, for example, an electric motor. On the side of the additional drive unit 5, which side faces away from the separating clutch 3, the shaft 4 is connected to a transmission 6, in particular a manual transmission. The shaft 4 thus constitutes a transmission input shaft on the side of the drive unit 5, which side faces the transmission 6. A transmission output shaft 7 is operatively connected to at least one wheel 8a of a chassis 8 of a motor vehicle. As is readily apparent, application of a torque upon the wheel, and thus propulsion of the motor vehicle can be established solely with the assistance of the further drive unit 5 and—as the separating clutch 3 is engaged—by both the drive unit 2 and the drive unit 5.

A centrifugal pendulum device 10 can be associated to the rotor 9, not shown here, of the drive unit 5 for vibration damping and is indicated here only schematically. As an alternative or in addition, the centrifugal pendulum device 10 may also be associated to the transmission 6. The centrifugal pendulum device 10 has a pendulum mass carrier 11, not shown here, and at least one pendulum mass 12 which is movably mounted thereto. The pendulum mass carrier 11 is connected in fixed rotative engagement with the shaft 4, when associated to the drive unit 5. When the centrifugal pendulum device 10 is associated to the transmission 6, the pendulum mass carrier is connected, for example, either to the shaft 4, to the transmission output shaft 7, or to a further shaft of the transmission 6, i.e. operatively connected thereto.

Figure 2:
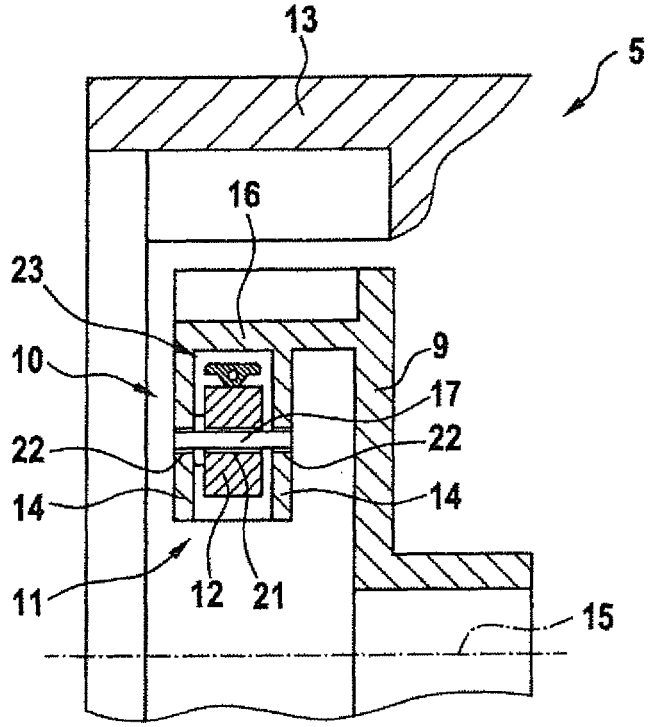

FIG. 2 shows a longitudinal sectional view of a portion of the further drive unit 5, which is designed as an electric machine and thus includes the rotor 9 and a stator 13. The pendulum mass carrier 11 of the centrifugal pendulum device 10 is formed in this case at least in some areas for example by the rotor 9. The pendulum mass carrier includes two retaining webs 14, which preferably are continuous in design in circumferential direction (in relation to a rotation axis 15 of the pendulum mass carrier 11). The retaining webs 14 protrude inwardly from a connecting web 16 in radial direction so as to have free ends on their sides facing away from the connecting web 16. The retaining webs 14 are spaced from each other in axial direction. The at least one pendulum mass 12 is arranged between the retaining webs 14 and is supported by means of a pin 17 for movement along a track 18, not visible here, in relation to the pendulum mass carrier 11 between two end stops 19 and 20 (not visible) spaced from one another in circumferential direction.

The pin 17 extends through a first guide groove 21 of the pendulum mass 12 and second guide grooves 22 of the retaining webs 14. The guide grooves 21 and 22 jointly define the track 18. Preferably, the guide grooves 21 and 22 are arcuate in circumferential direction, in particular continuously curved between the end stops 19 and 20. Thus, the distance of the pin from the rotation axis 15 changes over the course of the guide grooves 21 and 22 in this direction. The curvature of the guide grooves 22 is—as viewed in a cross section through the centrifugal pendulum device 10—preferably in opposite direction to the curvature of the guide groove 21. The centrifugal pendulum device 10 further includes a spring device 23 which is only hinted here. The spring device 23 is configured to urge the pendulum mass 12 against one of the end stops 19 and 20, when the rotation speed of the pendulum mass carrier 11 about the rotation axis 15 drops below a limit rotation speed.

Figure 3:
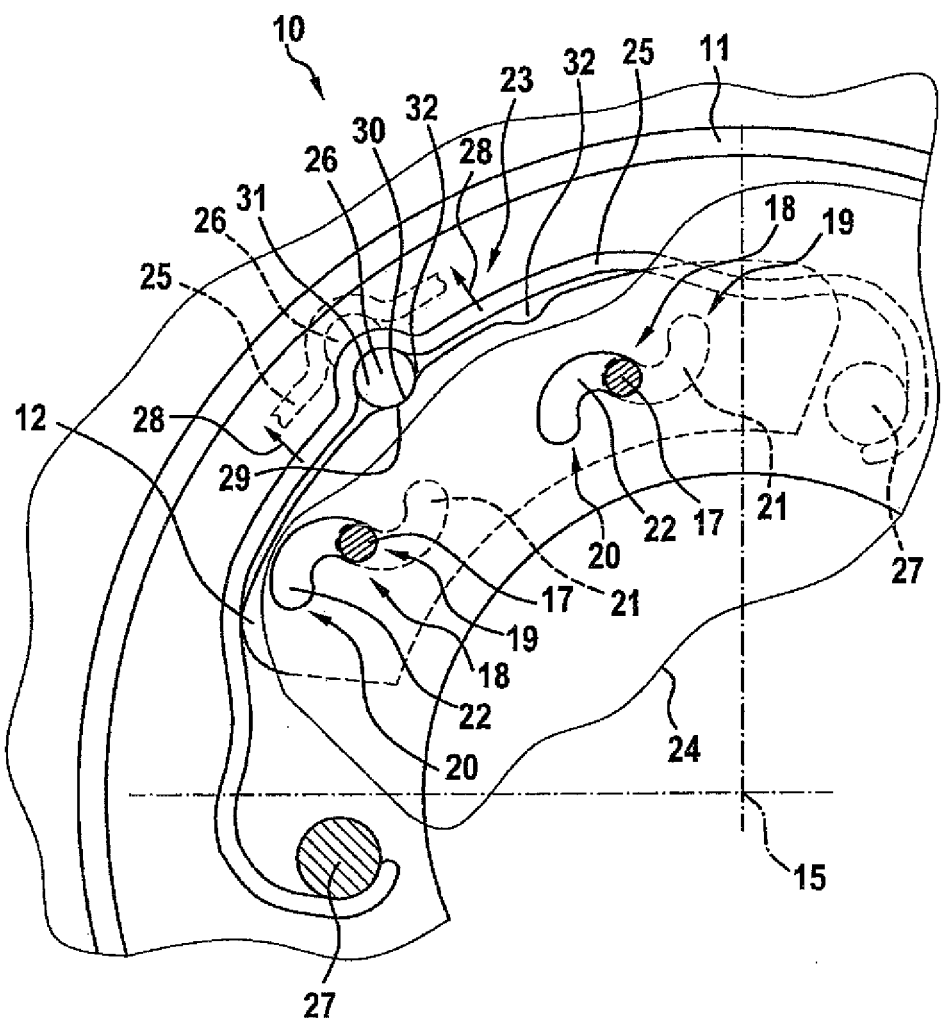

FIG. 3 shows a cross-sectional view of a portion of the centrifugal pendulum device 10. With respect to the drawing plane, the pendulum mass carrier 11 can be seen at the rear, whereas the at least one pendulum mass 12 is located with respect to the drawing plane at the front. In a region characterized by the line 24, the pendulum mass 12 is only hinted so that details of the pendulum mass carrier 11 can be recognized. In particular two second guide grooves 22 are visible and provided in the pendulum mass carrier 11. Preferably, associated to each pendulum mass 12 are two such second guide grooves 22 which are each provided in both retaining webs 14. Each of these two second guide grooves 22 is associated with a first guide groove 21, which, however, is not visible here.

It is apparent that the second guiding grooves 22 are curved with both their respective ends towards the rotation axis 15. They are designed in the shape of a kidney. Also the first guide groove 21 of the pendulum mass 12 is preferably kidney-shaped, but—as stated above—its curvature is in opposite direction, so that their ends point away from the rotation axis 15. The rotating pins 17 are both rotatably supported in the first guide groove 21 and the second guide groove 22. A shift of the pendulum mass 12 in relation to the pendulum mass carrier 11 therefore takes place along the track 18 jointly defined by the guide grooves 21 and 22. It becomes readily apparent that the guide grooves 21 and 22 jointly define for each track 18 two end stops 19 and 20, with the pendulum mass 12 situated in the selected illustration in the end stop 19. The end stops 19 and 20 are spaced from each other in circumferential direction. The track 18 is now configured such that the pendulum mass 12, when bearing against one of the end stops 19 and 20, is in a first radial position, which is smaller than a second radial position which is assumed by the pendulum mass 12, when it does not bear against the end stops 19 and 20.

Further shown is also the spring device 23, which includes in the exemplary embodiment depicted here a spring element 25 and a weight 26. The spring element 25 is suspended on two bolts 27 which are secured to the pendulum mass carrier 11. Accordingly, the spring member 25 is rotatable at least to a limited extent in relation to the pendulum mass carrier 11, with the support upon the bolts 27 being configured in particular in the form of a fixed bearing. The spring device 23 and the spring element 25 are designed such as to assume a first position, when a rotation speed of the pendulum mass carrier 11 about the rotation axis 15 is less than a limit rotation speed. However, when the rotation speed of the pendulum mass carrier 11 reaches or exceeds the limit rotation speed, the impact of a centrifugal force on the weight 26 causes a shift of the weight 26 in opposition to a spring force exerted by the spring element 25. This is illustrated by the arrows 28. Also indicated by way of dashed lines is the now current position of the spring element 25 and the weight 26.

The weight 26 has a contact area 29 which can come into touching contact with a mating contact area 30 of the pendulum mass 12 in the presence of a corresponding arrangement of weight 26 and pendulum mass 12 relative to one another. The contact area 29 has a locking element 31 and the mating contact area 30 or the pendulum mass 12 has a mating locking element 32. The locking element 31 is preferably configured as protrusion and the mating locking element 32 as a locking element receptacle, i.e. as a depression of a shape complementing the locking element 31. The pendulum mass 12 has several mating locking elements 32, with each end stop 19 and 20 being associated with one of these mating locking elements 32. The locking element 31 and the mating locking elements 32 are arranged such that when the pendulum mass 12 abuts the end stop 19, the locking element 31 is arranged in a first of the mating locking elements 32, and when abutting the end stop 20 in a further of the mating locking elements 32. As a result of the formfitting engagement of the locking element 31 in the respective mating locking element 32, the pendulum mass 12 is reliably held upon or in the respective end stop 19 or 20.

The spring element 25 is now configured such that the contact area 29 or the locking element 31, when the rotation speed of the pendulum mass carrier 11 drops below the limit rotation speed, is urged toward a radial holding position, which is indicated by solid lines in the selected illustration. In this radial holding position, the pendulum mass 12 is acted upon by a spring force which is directed in direction of the first radial position and thus urged toward one of the end stops 19 and 20. When the respective end stop 19 or 20 has been reached, the locking element 31 engages the corresponding mating locking element 32. Subsequently, the pendulum mass 12 is reliably secured against displacement and is urged into the end stop 19 or 20. In this way unwanted shifts of the pendulum mass 12 in relation to the pendulum mass 11 carrier, which can cause unwanted noise, are reliably avoided.

When, however, the rotation speed of the pendulum mass carrier 11 reaches the limit rotation speed or exceeds it, the weight 26 and therefore the contact area 29 is shifted in opposition to the spring force of the spring element 25 in direction of the arrows 28 into a radial release position, which is indicated with dashed lines. In this radial release position, the contact area 29 or the locking element 31 is arranged such that the pendulum mass 12 can move freely along the track 18. As a result, a reliable vibration damping is realized.

Of course, numerous variations of the afore-described centrifugal pendulum device 10 can be realized. For example, the centrifugal pendulum device can be associated instead of to the drive unit 5 or the transmission 6, to a vibration damper, in particular a rotation speed alternative vibration damper, which includes at least one spring element for vibration damping. Also, an alternative type of support of the pendulum mass 12 upon the pendulum mass carrier 11 may, of course, be provided. For example, provision of a sole retaining web 14 can be contemplated, on which a respective pendulum mass 12 can be provided on both sides. It is hereby only important to provide the spring device 23, which urges the pendulum mass 12 in or against one of the stops 19 and 20, when the rotation speed of the pendulum mass carrier 11 drops below the limit rotation speed, so that the pendulum mass is locked 12 and consequently the unwanted noise is reliably avoided.

The invention claimed is:

1. A centrifugal pendulum device, comprising:
a pendulum mass carrier rotatable about a rotation axis;
at least one pendulum mass supported on the pendulum mass carrier for movement along a track between end stops which are spaced from one another in a circumferential direction in relation to the rotation axis; and
a spring device configured to urge the pendulum mass into one of the end stops, when a rotation speed of the pendulum mass carrier about the rotation axis drops below a limit rotation speed, wherein the spring device is configured to urge the pendulum mass in a radial inward direction to a first radial position, when the rotation speed drops below the limit rotation speed, said spring device having a spring element provided with a contact area and configured such that the contact area is urged toward a radial holding position, when the rotation speed drops below the limit rotation speed, so that the pendulum mass is subjected to a spring force pointing in the direction of the first radial position, and assumes a radial release position, when the rotation speed is greater than or equal to the limit rotation speed, under the influence of a centrifugal force, wherein the contact area comprises a locking element and the pendulum mass comprises at least one mating locking element, said locking element and said at least one mating locking element interacting with one another by a form fit in the circumferential direction at least when the contact area assumes the radial holding position for fixation of the pendulum mass relative to the pendulum mass carrier.

2. The centrifugal pendulum device of claim 1, wherein the track is configured such that the pendulum mass, when resting upon one of the end stops, assumes in relation to the rotation axis the first radial position defined by a first radial distance to the rotation axis, and, when distanced from the end stops, assumes a second radial position defined by a second radial distance which is greater than the first radial distance.

3. The centrifugal pendulum device of claim 1, wherein the spring device is configured to urge the pendulum mass in the radial inward direction, when the rotation speed drops below the limit rotation speed.

4. The centrifugal pendulum device of claim 1, wherein the at least one mating locking element comprises a plurality of mating locking elements.

5. The centrifugal pendulum device of claim 1, wherein the at least one mating locking element and the mating locking element are arranged for holding the pendulum mass, when the contact area is arranged in the radial holding position, and the pendulum mass bears against the end stop which is associated to the at least one mating locking element.

6. The centrifugal pendulum device of claim 1, wherein the spring element comprises a weight, which effects the impact of the centrifugal force, said contact area and/or said locking element being formed on the weight.

7. The centrifugal pendulum device of claim 1, wherein the spring element is supported on the pendulum mass carrier on both sides of the contact area, as viewed in the circumferential direction.

8. The centrifugal pendulum device of claim 1, wherein the spring element is rotatably supported on the pendulum mass carrier on both sides of the contact area, as viewed in the circumferential direction.

9. A drive train of a motor vehicle, comprising:
a drive unit; and
at least one wheel capable of being driven by the drive unit; and
a centrifugal pendulum device configured to at least in part suppress torsional vibrations caused by the drive unit, said centrifugal pendulum device including a pendulum mass carrier rotatable about a rotation axis, at least one pendulum mass supported on the pendulum mass carrier for movement along a track between end stops which are spaced from one another in a circumferential direction in relation to the rotation axis, and a spring device configured to urge the pendulum mass into one of the end stops, when a rotation speed of the pendulum mass carrier about the rotation axis drops below a limit rotation speed, wherein the spring device is configured to urge the pendulum mass in a radial inward direction to a first radial position, when the rotation speed drops below the limit rotation speed, said spring device having a spring element provided with a contact area and configured such that the contact area is urged toward a radial holding position, when the rotation speed drops below the limit rotation speed, so that the pendulum mass is subjected to a spring force pointing in the direction of the first radial position, and assumes a radial release position, when the rotation speed is greater than or equal to the limit rotation speed, under the influence of a centrifugal force, wherein the contact area comprises a locking element and the pendulum mass comprises at least one mating locking element, said locking element and said at least one mating locking element interacting with one another by a form fit in the circumferential direction at least when the contact area assumes the radial holding position for fixation of the pendulum mass relative to the pendulum mass carrier.

10. The drive train of claim 9, wherein the centrifugal pendulum device is permanently connected to the at least one wheel.

11. The drive train of claim 9, wherein the track is configured such that the pendulum mass, when resting upon one of the end stops, assumes in relation to the rotation axis the first radial position defined by a first radial distance to the rotation axis, and, when distanced from the end stops, assumes a second radial position defined by a second radial distance which is greater than the first radial distance.

12. The drive train of claim 9, wherein the spring device is configured to urge the pendulum mass in the radial inward direction, when the rotation speed drops below the limit rotation speed.

13. The drive train of claim 9, wherein the at least one mating locking element comprises a plurality of mating locking elements.

14. The drive train of claim 9, wherein the locking element and the mating locking element are arranged for holding the pendulum mass, when the contact area is arranged in the radial holding position, and the pendulum mass bears against the end stop which is associated to the mating locking element.

15. The drive train of claim 9, wherein the spring element comprises a weight, which effects the impact of the centrifugal force, said contact area and/or said locking element being formed on the weight.

16. The drive train of claim 9, wherein the spring element is supported on the pendulum mass carrier on both sides of the contact area, as viewed in the circumferential direction.

17. The drive train of claim 9, wherein the spring element is rotatably supported on the pendulum mass carrier on both sides of the contact area, as viewed in the circumferential direction.

* * * * *